(12) United States Patent
Kamath et al.

(10) Patent No.: US 9,817,622 B2
(45) Date of Patent: Nov. 14, 2017

(54) CLOUD PRINTER WITH A COMMON USER PRINT EXPERIENCE

(75) Inventors: Harish B Kamath, Bengalooru Karanataka (IN); Sridhar Solur, London (GB); David William Pitkin, Groton, MA (US); Vss Iyer, Chennai Tamil Nadu (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 506 days.

(21) Appl. No.: 13/387,029

(22) PCT Filed: Jan. 20, 2010

(86) PCT No.: PCT/US2010/021442
§ 371 (c)(1),
(2), (4) Date: Jan. 25, 2012

(87) PCT Pub. No.: WO2011/090474
PCT Pub. Date: Jul. 28, 2011

(65) Prior Publication Data
US 2012/0140285 A1   Jun. 7, 2012

(51) Int. Cl.
*G06F 3/12* (2006.01)

(52) U.S. Cl.
CPC ............ *G06F 3/1288* (2013.01); *G06F 3/122* (2013.01); *G06F 3/1204* (2013.01); *G06F 3/1228* (2013.01); *G06F 3/1268* (2013.01); *G06F 3/1287* (2013.01); *G06F 3/1292* (2013.01); *G06F 3/1226* (2013.01); *G06F 3/1231* (2013.01)

(58) Field of Classification Search
None
See application file for complete search history.

(56) References Cited

U.S. PATENT DOCUMENTS

| | | | |
|---|---|---|---|
| 5,090,231 | A | 2/1992 | Gallagher |
| 5,287,194 | A | 2/1994 | Lobiondo |
| 5,559,993 | A | 9/1996 | Boswell |
| 5,832,191 | A | 11/1998 | Thorne |
| 5,862,471 | A | 1/1999 | Tiedemann et al. |
| 6,285,889 | B1 | 9/2001 | Nykanen |
| 6,335,795 | B1 | 1/2002 | Neuhard et al. |
| 6,337,745 | B1 | 1/2002 | Aiello, Jr. et al. |
| 6,359,642 | B1 | 3/2002 | Smith |

(Continued)

FOREIGN PATENT DOCUMENTS

| | | |
|---|---|---|
| CN | 101004668 | 7/2007 |
| CN | 101237424 | 8/2008 |

(Continued)

OTHER PUBLICATIONS

Blackberry Rocks;HP and RIM announce Strategic Alliance to Mobilize Business on Blackberry;Webpage ~ May 4, 2009 ~ retrieved on Jun. 7, 2010;1-4;Supplemental.

(Continued)

*Primary Examiner* — Hilina K Demeter
(74) *Attorney, Agent, or Firm* — HP Inc. Patent Department (57) ABSTRACT

One embodiment is a portable electronic device that prints a document to a printer. A common user print experience is displayed regardless of a type of operating system installed on the portable electronic device.

20 Claims, 6 Drawing Sheets

(56) References Cited

U.S. PATENT DOCUMENTS

| | | | |
|---|---|---|---|
| 6,417,913 B2 | 7/2002 | Tanaka |
| 6,516,157 B1 | 2/2003 | Maruta et al. |
| 6,552,813 B2 | 4/2003 | Yacoub |
| 6,560,621 B2 | 5/2003 | Barile |
| 6,606,162 B1 | 8/2003 | Simpson |
| 6,621,589 B1 | 9/2003 | Al-Kazily et al. |
| 6,650,433 B1 | 11/2003 | Keane et al. |
| 6,650,946 B2 | 11/2003 | Bauer |
| 6,678,750 B2 | 1/2004 | Tagg et al. |
| 6,748,471 B1 | 6/2004 | Keeney |
| 6,751,732 B2 | 6/2004 | Strobel et al. |
| 6,757,070 B1 | 9/2004 | Lin et al. |
| 6,806,976 B1 | 10/2004 | Suyehira |
| 6,859,832 B1 | 2/2005 | Gecht et al. |
| 6,909,518 B2 | 6/2005 | Miller et al. |
| 6,978,299 B1 | 12/2005 | Lodwick |
| 6,993,562 B2 | 1/2006 | Treptow et al. |
| 6,996,611 B1 | 2/2006 | Muto |
| 7,019,861 B2 | 3/2006 | Aagesen |
| 7,051,095 B1 | 5/2006 | Cantwell |
| 7,064,856 B2 | 6/2006 | Fu et al. |
| 7,088,462 B2 | 8/2006 | Bhogal et al. |
| 7,096,265 B2 | 8/2006 | Simpson et al. |
| 7,106,470 B2 | 9/2006 | Parry |
| 7,113,300 B2 | 9/2006 | Strobel et al. |
| 7,120,667 B2 | 10/2006 | Derocher et al. |
| 7,143,210 B2 | 11/2006 | Ferlitsch |
| 7,167,264 B2 | 1/2007 | Takamiya |
| 7,167,930 B2 | 1/2007 | Reilly |
| 7,184,159 B2 | 2/2007 | Bergstrand |
| 7,187,462 B2 | 3/2007 | Oakeson et al. |
| 7,191,327 B2 | 3/2007 | Viljoen et al. |
| 7,212,297 B2 | 5/2007 | Liang et al. |
| 7,218,411 B2 | 5/2007 | Hohensee et al. |
| 7,225,220 B2 | 5/2007 | Gonzalez et al. |
| 7,231,605 B1 | 6/2007 | Ramakesavan |
| 7,239,877 B2 | 6/2007 | Corneille et al. |
| 7,256,900 B1 | 8/2007 | Hanaoka |
| 7,265,867 B2 | 9/2007 | Fu et al. |
| 7,272,407 B2 | 9/2007 | Strittmatter et al. |
| 7,315,824 B2 | 1/2008 | Chen et al. |
| 7,365,872 B2 | 4/2008 | Lawrence et al. |
| 7,441,003 B1 | 10/2008 | Takeda et al. |
| 7,576,883 B2 | 8/2009 | Ragnet et al. |
| 7,647,074 B2 | 1/2010 | McCoog et al. |
| 7,656,547 B2 | 2/2010 | Kuo et al. |
| 7,760,385 B2 | 7/2010 | Yamaguchi |
| 7,791,747 B2 | 9/2010 | Roksz |
| 7,800,768 B2 | 9/2010 | Yamada |
| 7,941,458 B2 | 5/2011 | Torr |
| 7,945,573 B1 | 5/2011 | Barnes et al. |
| 8,010,469 B2 | 8/2011 | Kapoor et al. |
| 8,045,485 B2 | 10/2011 | Shima et al. |
| 8,115,943 B2 | 2/2012 | Ohishi et al. |
| 8,126,904 B1 | 2/2012 | Bettinger et al. |
| 8,179,549 B1 | 5/2012 | Evans |
| 8,223,355 B2 | 7/2012 | McCoog et al. |
| 8,253,956 B2 | 8/2012 | Han |
| 8,468,240 B2 | 6/2013 | Prati |
| 8,570,566 B2 | 10/2013 | St. Laurent et al. |
| 2001/0013053 A1 | 8/2001 | Yamazaki |
| 2001/0043357 A1 | 11/2001 | Owa et al. |
| 2002/0002592 A1 | 1/2002 | Mikio et al. |
| 2002/0013869 A1 | 1/2002 | Taniguchi et al. |
| 2002/0044299 A1* | 4/2002 | Iwase .................. H04L 29/06 |
| | | | 358/1.15 |
| 2002/0078160 A1 | 6/2002 | Kemp et al. |
| 2002/0083121 A1 | 6/2002 | Chang |
| 2003/0002072 A1* | 1/2003 | Berkema ............ G06F 3/1205 |
| | | | 358/1.15 |
| 2003/0036350 A1 | 2/2003 | Jonsson |
| 2003/0053122 A1 | 3/2003 | Kinoshita |
| 2003/0078987 A1 | 4/2003 | Serebrennikov |
| 2003/0107762 A1 | 6/2003 | Kinoshita et al. |
| 2003/0115199 A1 | 6/2003 | Ochiai |
| 2003/0115458 A1 | 6/2003 | Song |
| 2003/0160977 A1 | 8/2003 | Kimura |
| 2003/0184557 A1 | 10/2003 | Wen |
| 2003/0231328 A1 | 12/2003 | Chapin et al. |
| 2004/0024787 A1 | 2/2004 | Edwards et al. |
| 2004/0039647 A1 | 2/2004 | Roche et al. |
| 2004/0100505 A1 | 5/2004 | Cazier |
| 2004/0125145 A1* | 7/2004 | Sano .................... G06F 3/0486 |
| | | | 715/771 |
| 2004/0125401 A1 | 7/2004 | Earl et al. |
| 2004/0130744 A1 | 7/2004 | Wu et al. |
| 2004/0137855 A1 | 7/2004 | Wiley et al. |
| 2004/0137928 A1 | 7/2004 | Biundo |
| 2004/0162804 A1 | 8/2004 | Strittmatter et al. |
| 2004/0176117 A1 | 9/2004 | Strittmatter et al. |
| 2004/0176118 A1 | 9/2004 | Strittmatter et al. |
| 2004/0203439 A1 | 10/2004 | Zerressen |
| 2004/0218201 A1 | 11/2004 | Lermant et al. |
| 2004/0218213 A1 | 11/2004 | Shimizu et al. |
| 2004/0230646 A1 | 11/2004 | Clough et al. |
| 2004/0252329 A1 | 12/2004 | Sorenson |
| 2004/0252332 A1 | 12/2004 | McCoog et al. |
| 2004/0253990 A1 | 12/2004 | McCoog et al. |
| 2005/0073522 A1 | 4/2005 | Aholainen |
| 2005/0088681 A1 | 4/2005 | Hosoda |
| 2005/0099639 A1 | 5/2005 | Payne et al. |
| 2005/0111856 A1 | 5/2005 | Kawai |
| 2005/0259287 A1 | 11/2005 | Watanabe |
| 2005/0270569 A1 | 12/2005 | Hayashi |
| 2006/0012828 A1* | 1/2006 | Ohta .................... H04W 48/00 |
| | | | 358/1.18 |
| 2006/0028681 A1* | 2/2006 | Aagesen .............. G06F 3/1206 |
| | | | 358/1.15 |
| 2006/0044598 A1 | 3/2006 | Etelapera |
| 2006/0158681 A1 | 7/2006 | Yorimoto et al. |
| 2006/0258341 A1 | 11/2006 | Miller et al. |
| 2006/0259394 A1 | 11/2006 | Cushing et al. |
| 2007/0010915 A1 | 1/2007 | Burson et al. |
| 2007/0027990 A1 | 2/2007 | Nakaoka et al. |
| 2007/0030516 A1* | 2/2007 | Tsuji .................... G06F 3/1204 |
| | | | 358/1.15 |
| 2007/0050373 A1 | 3/2007 | Ahmed et al. |
| 2007/0088814 A1 | 4/2007 | Torii |
| 2007/0093265 A1 | 4/2007 | Krykun |
| 2007/0127069 A1 | 6/2007 | Steele et al. |
| 2007/0195345 A1 | 8/2007 | Martinez et al. |
| 2007/0229879 A1 | 10/2007 | Harmon et al. |
| 2007/0229880 A1 | 10/2007 | Harmon et al. |
| 2007/0229891 A1 | 10/2007 | Yanagi et al. |
| 2007/0233834 A1 | 10/2007 | Hattori et al. |
| 2007/0297009 A1 | 12/2007 | Kikuchi |
| 2008/0072254 A1 | 3/2008 | Jung et al. |
| 2008/0132252 A1* | 6/2008 | Altman ............... G06Q 30/0207 |
| | | | 455/457 |
| 2008/0134316 A1 | 6/2008 | Devonshire et al. |
| 2008/0180712 A1 | 7/2008 | Selvaraj |
| 2008/0180726 A1 | 7/2008 | Selvaraj |
| 2008/0184162 A1* | 7/2008 | Lindsey ............... G06F 3/1204 |
| | | | 715/783 |
| 2008/0225326 A1 | 9/2008 | Kephart et al. |
| 2008/0239366 A1 | 10/2008 | Cyman et al. |
| 2008/0246988 A1 | 10/2008 | Ashton |
| 2009/0009802 A1 | 1/2009 | Shaw et al. |
| 2009/0033976 A1 | 2/2009 | Ding |
| 2009/0147299 A1 | 6/2009 | Tetu |
| 2009/0168100 A1 | 7/2009 | Huster |
| 2009/0174894 A1 | 7/2009 | Kamijo |
| 2009/0177381 A1 | 7/2009 | Taniguchi et al. |
| 2009/0216912 A1 | 8/2009 | Lee et al. |
| 2009/0257082 A1 | 10/2009 | Kohli et al. |
| 2009/0279126 A1 | 11/2009 | Williams |
| 2009/0287408 A1 | 11/2009 | Gerdes et al. |
| 2009/0296125 A1 | 12/2009 | Kai |
| 2009/0300226 A1 | 12/2009 | Rubio |
| 2009/0303523 A1 | 12/2009 | Moross et al. |
| 2010/0073707 A1* | 3/2010 | Ferlitsch ............. H04N 1/00222 |
| | | | 358/1.15 |

(56) References Cited

U.S. PATENT DOCUMENTS

| | | | |
|---|---|---|---|
| 2010/0144376 A1* | 6/2010 | Pawlecki | H04L 51/38 455/456.6 |
| 2010/0161832 A1 | 6/2010 | Komine | |
| 2010/0169003 A1 | 7/2010 | Van Der Meer | |
| 2010/0174698 A1 | 7/2010 | Odland et al. | |
| 2010/0238493 A1 | 9/2010 | Sako et al. | |
| 2010/0277753 A1 | 11/2010 | Shinchi | |
| 2010/0290073 A1 | 11/2010 | Nuggehalli et al. | |
| 2010/0309508 A1* | 12/2010 | Kamath | G06F 3/1204 358/1.15 |
| 2010/0309510 A1 | 12/2010 | Hansen | |
| 2011/0063668 A1 | 3/2011 | Shirai | |
| 2011/0096354 A1* | 4/2011 | Liu | G06F 3/1204 358/1.15 |
| 2011/0145085 A1 | 6/2011 | Khachatrian et al. | |
| 2011/0145930 A1 | 6/2011 | Gnech et al. | |
| 2011/0196731 A1 | 8/2011 | Christie et al. | |
| 2011/0202914 A1 | 8/2011 | Kim et al. | |
| 2011/0242576 A1 | 10/2011 | Allen et al. | |
| 2011/0271197 A1 | 11/2011 | Jones et al. | |
| 2011/0276986 A1 | 11/2011 | Kamath | |
| 2011/0277027 A1 | 11/2011 | Hayton et al. | |
| 2012/0019864 A1 | 1/2012 | Mickeleit et al. | |
| 2012/0026536 A1 | 2/2012 | Shah | |
| 2012/0038948 A1 | 2/2012 | Park | |
| 2012/0066374 A1 | 3/2012 | Azzolin et al. | |
| 2012/0069386 A1* | 3/2012 | St. Laurent | G06F 3/1204 358/1.15 |
| 2012/0250074 A1 | 10/2012 | Kamppari et al. | |
| 2012/0262753 A1 | 10/2012 | Viccari et al. | |
| 2013/0038897 A1 | 2/2013 | Heckler et al. | |
| 2013/0107312 A1 | 5/2013 | Venkatesh | |
| 2013/0321855 A1 | 12/2013 | Bhatia | |

FOREIGN PATENT DOCUMENTS

| | | |
|---|---|---|
| CN | 100470513 | 3/2009 |
| CN | 101520829 | 9/2009 |
| EP | 1107512 | 6/2001 |
| EP | 1271300 | 1/2003 |
| EP | 1450515 A2 | 8/2004 |
| EP | 1646037 A2 | 4/2006 |
| EP | 1937007 A1 | 6/2008 |
| FR | 2907620 A1 | 4/2008 |
| GB | 2360914 | 10/2001 |
| JP | 2001197150 | 7/2001 |
| JP | 2001344163 | 12/2001 |
| JP | 2002112347 | 4/2002 |
| JP | 2002245003 A | 8/2002 |
| JP | 2002264431 A | 9/2002 |
| JP | 2002290416 A | 10/2002 |
| JP | 2002305521 A | 10/2002 |
| JP | 2006277197 A | 10/2006 |
| JP | 2007133817 | 5/2007 |
| KR | 20030042078 A | 5/2003 |
| WO | WO-0041064 A1 | 7/2000 |
| WO | WO-0174011 | 10/2001 |
| WO | WO-2007112334 A2 | 10/2007 |
| WO | WO-2008148576 A1 | 12/2008 |
| WO | WO-2009120154 | 10/2009 |
| WO | WO-2012112159 | 8/2012 |
| WO | WO-2012147089 A1 | 11/2012 |

OTHER PUBLICATIONS

HP and BlackBerry;Weaving mobility into the fabric of the enterprises;WES2009 ~ May 6, 2009;1; Supplemental.

HP and RIM;Increasing the value of Enterprise Software for mobile employees; PowerPoint ~ May 6, 2009;1-32;Supplemental.

If It Prints, I'll Let You Know;Print Anywhere From Your BlackBerry Through HP CloudPrint;Website ~ Retrieved on Jun. 7, 2010;1-4;Supplemental.

LetsTalk.com/Phone Talk;Is HPs Cliud Print the future of printing on-the-go?;Website May 6, 2009 ~ retrieved on Jun. 7, 2010;1-3;Supplemental.

Pfeifle et al., "CUPS Printing Support," Samba, Part III, Chapter 22, Jan. 27, 2004, <http://www.samba.org/samba/docs/man/Samba-HOWTO-Collection/Cups-printing.html>.

USPTO, Office Action issued in relation to U.S. Appl. No. 12/881,975, dated Aug. 21, 2012.

Hewlett-Packard Development Company, L.P., "HP Universal Print Driver v5.7.0.16448," Release Notes, Sep. 17, 2013, <http://h10032.www1.hp.com/ctg/Manual/c03635717.pdf>.

Hewlett-Packard Development Company, L.P., "Service Administration Guide," HP Managed Printing Administration, edition 1, May 2006.

Line Printer Daemon Protocol, Network Printing Working Group, Aug. 1990, pp. 1-12.

Microsoft Corp., "To search for a printer," Jan 6, 2008, <http://web.archive.org/web/20080106161518/http://www.microsoft.com/resources/documentation/windows/xp/all/proddocs/en.

Microsoft Tech Net, How Network Printing Works, Microsoft Corporation, Mar. 28, 2003, pp. 1-11.

Service Discovery Application Profile, Feb. 22, 2001, pp. 64-98, Bluetooth Specification Version 1.1.

Taylor Thomas, "Online Printing Services Review," Mimeo, available online Aug. 21, 2009, <http://web.archive.org/web/20090821133549/http://online-printing-services-review.to.

Yang, et al.; Offer with Choices and Accept with Delay: A Win-Win Strategy Model for Agent Based Automated Negotiation; ICIS 2009 Proceedings; 20 pgs.

Yinping, et al.; Designing an Intellectual Agent that Negotiates Tactfully with Human Counterparts: A conceptual Analysis and Modeling Framework; 42nd Hawaii ICSS-2009; 10 pgs.

"Weaving mobility into the fabric of the enterprise," WES 2009, HP and Blackberry Event Flyer, 2009, 1 page.

Blecher, Joni; "Is HPs Cloud Print the future of printing on-the-go?" http://www.letstalk.com/blog/post.htm?blogId=989; May 6, 2009, 3 pages.

Garcia, Victor; "HP & RIM—Increasing the value of Enterprise Software for mobile employees," WES 2009 VG Breakout Session; May 3, 2009, 32 pages.

Intelligent Print Job Routing http://www.printech.com/intelligent print_job routing.htm.

International Search Report and Written Opinion received for PCT Application No. PCT/US2010/048790, dated Apr. 27, 2011, pp. 10.

Mauricio, "HP and RIM Announce Strategic Alliance to Mobilize Business on BlackBerry," http://blackberryrocks.com/2009/05/04/hp-rim-announce-strategic-alliance-mobilize-busine.

Print Where Business Happens, (Research Paper), Jul. 5, 2012.

Rules & Routing http://www.equitrac.com/downloads/5379-Rules-Routing_7-10.pdf.

Setting Up Multiple Printers Using Same IP Address with Different Ports http://www.experts-exchange.com/OS/Microsoft_Operating_Systems/Server/2003_Server/Q_26107790. html.

The Enterprise-wide Network Solution for Effective Print Job Management http://www.ricoh-europe.com/Binary/doc_q_man_tcm101-10420.pdf.

Wolber, A., Print Anywhere: Chrome, Google Apps and Cloud Print (Web Page), Oct. 9, 2012.

Xerox® Mobile Print, (Web Page), 2011.

Develop, "Develop Joins Cloud Printing Alliance," (Research Paper), 2012, available at http://www.develop.de/en/0/143_newsdetail.htm.

Fernandes, L. et al., "The mobile print enterprise," (Research Paper), Jan. 2012, 9 pages, available at http://www.quocirca.com/media/reports/012012/653/The%20mobile%20print%20enterprise%20Public%20Excerpt%20Jan%202012.pdf.

International Preliminary Report on Patentability received in PCT Application No. PCT/US2010/048790, dated Aug. 23, 2012, 7 pages.

International Search Report & Written Opinion received in PCT Application No. PCT/US2012/044098, dated Feb. 20, 2013, 9 pages.

internationa Search Report and Written Opinion received in PCT Application No. PCT/US2010/021442, dated Sep. 30, 2010, pp. 9.

(56) References Cited

OTHER PUBLICATIONS

"Xerox® Enterprise Print Services Connecting the Remote and Mobile Workforce," Sep. 2010, <http://www.xerox.com/downloads/usa/en/xgs/brochures/xgs_brochure_remote_mobile_work.
Assigned Numbers—Bluetooth Baseband, Bluetooth Sig. Inc., 2003 www.bluetooth.org/foundry/assignnumb/document/baseband.
Bluetooth, "The Bluetooth System, Core, Version 1.0 B," Service Discovery Protocol SDP, Dec. 1, 1999 (Dec. 1, 1999), XP002176975, retrieved on Sep. 7, 2001, retrieved from the http://grouper.ieee.org/groups/802/15/Bluetooth/profile_10_b.pdf.
Communication pursuant to Article 96(2) EPC issued in connection with European patent application No. 03022525, dated Dec. 16, 2004.
David Suffield, "HPLIP 2008 State of Affair," Apr. 2008, <http://www.linuxfoundation.org/images/6/6d/Hplip_2008.pdf>.
European Search Report issued in connection with European patent application No. 03022525, dated Jan. 29, 2004.
Hewlett-Packard Co., HP Jornada 520, 540, and 560 Series Pocket PC and HP Deskjet 995C—Printing with Bluetooth Using the Anycom, Inc. Bluetooth Card, On-line Customer Support.
Hewlett-Packard Development Company, L.P, "HP Universal Print Driver," Apr. 2009, <http://www.governorsolutions.com/wp-content/uploads/2011/08/UPD-2009-DS-final1.pdf>.
Hewlett-Packard Development Company, L.P, "HP Universal Print Driver," Solution and Feature Guide, 2009, <http://h20331.www2.hp.com/Hpsub/downloads/UPD5_guide_final,%20web.pdf.
Hewlett-Packard Development Company, L.P., "HP Driver and Queue Management Solutions," Mar. 2009, <http://h20195.www2.hp.com/v2/GetDocument.aspx?cc=us&doclang=EN_US&docname=4.
Equitrac, "Rules & Routing," (Brochure), 2010, retrieved from the internet at: http://www.equitrac.com/downloads/5379-Rules-Routing_7-10.pdf.
International Preliminary Report on Patentability received in PCT Application No. PCT/US2010/021442, dated Aug. 2, 2012, 6 pages.
International Search Report & Written Opinion received in PCT Application No. PCT/US2010/021442, dated Sep. 30, 2010, 9 pages.
Printech, "Intelligent Print Job Routing," 2009, 1 page, retrieved at: http://www.printech.com/intelligent_print_job_routing.htm.
Experts Exchange, "Setting up multiple printers using same IP address with different ports" Apr. 29, 2010, 3 pages retrieved at : https://www.experts-exchange.com/questions.html.
Ricoh, "doc-Q-manager, The Enterprise-wide Network Solution for Effective Print Job Management" Print Solutions Aficio Series, Oct. 3, 2006, available at: http://www.ricoh-me.com.

\* cited by examiner

CLOUD PRINTER WITH A COMMON USER PRINT EXPERIENCE

FIELD OF THE INVENTION

The present invention relates to a portable electronic device that performs a print operation with a common user print experience.

BACKGROUND

Document printing is achieved with an associated application of a platform executed by an operating system. The platforms and associated applications vary widely from one device to another device. A user can have different print experiences while printing from one computer to another computer. This variation occurs because different print platforms and associated applications provide users with different print menus, options, and steps-to-print.

In addition to these various user print experiences, many users do not know or understand the complex set of procedures needed to install a printer to a remote print server or print to such a remote printer. Printing across a network can be further complicated for users since a current print driver may not be installed or a hardware interface not supported. Furthermore, users need to be aware of location details to access printer resources. Such resources may be embedded in a printer or provided by a vendor on a CD or on a web-site. Users may have to consult reference material to determine how to install a print driver or print to a network printer. Networked printers, typically in a home or home-office environment, are isolated from the computer which is configured to work on a virtual private network (VPN).

SUMMARY OF THE INVENTION

One embodiment is a portable electronic device that performs a print operation to a cloud printer. A common user print experience is displayed regardless of a type of operating system installed on the portable electronic device.

DETAILED DESCRIPTION

Example embodiments provide users with a common or unified print experience while performing a print operation to cloud printers from different portable electronic devices running different operating systems, print platforms, and associated print applications. For example, a user printing from a laptop computer will have a similar print experience to a user printing from a small portable electronic device, such as a blackberry, camera, or mobile phone.

In one embodiment, users can perform a print operation to a cloud printer with a small or minimal number of steps or interactions with the electronic device. As used herein a "print operation" includes, but is not limited to, printing to a cloud printer, managing a print job or cloud printer or print parameter settings of a cloud printer from a remote electronic device, installing or registering a cloud printer, and monitoring a cloud printer or print job from a remote electronic device. For example, users can print with three actuations or three click operations from an electronic device regardless of what type of operating systems are being executed (i.e., such as Solaris, Macintosh, Linux, Windows, etc.). These actuations include (1) selecting a print button or print operation, (2) selecting a cloud printer from a list of available or relevant printers, and (3) confirming the print operation to the selected cloud printer. Once these three activities occur, the electronic device will perform a print operation over the web to a designated cloud printer or web-enabled printer.

With example embodiments, users are not required to install a print driver to perform print operations from an electronic device to a remote printer in communication with a cloud print server. In other words, the electronic device can execute a print job without a print driver. Printing steps or a print button on the electronic device are not tied to the operating system executing on the electronic device.

Users can access a network of cloud printers and send print requests or print jobs to these printers. Selection of a printer is based on print requirements or print parameters desired by the user, such as printing with a certain color, level of security, geographical location, print quality, time frame to complete print job, etc.

In one embodiment, users install printers over the internee with an Internet Print Service (ISP). Printers and other electronic devices (including multi-functional devices that scan, copy, and/or print) are installed with an installation process that includes identifying the user and printer, configuring print parameters and other settings, and registering the user and printer with a cloud print server. The installation process includes an automated mechanism to install printers with the ISP and be self-configured to start receiving print jobs after installation.

Example embodiments facilitate the installation process of a printer over a network to a remote server. For example, the installation process for users is simplified since few steps are used. Technical expertise is not required since installation is largely automated with few manual steps performed by the user. Installation of the printer can occur without a user having knowledge of printer capabilities, such as printer language being supported, printer resolution, duplex capability, etc.

During installation printers are uniquely identified, and identification occurs independently of TCP/IP network in which the printer is physically located (TCP/IP is an Internet Protocol Suite: Transmission Control Protocol and Internet Protocol). The installation process with example embodiments also overcomes firewall restrictions that normally hinder web services access to network peripherals. Installation can occur inside or across a firewall. Installation occurs without, for example, configuration of network elements and configurations of a router.

After the printer connects to the ISP and the user performs a few steps, the user can print to the printer from a remote electronic device. Users are able to print emails, documents, photos, web pages, etc. from a variety of different portable devices running different operating systems. Mobile users can print to one or more printers from any worldwide location that provides internet access, regardless of whether the user is located at home, in the office, on the road, in a foreign country, etc. The print services provided by the cloud print system are printer-agnostic and driverless (i.e., the computers of the users are not required to have a print driver: software that converts data to be printed to a form specific to the printer). Although one embodiment uses driverless systems, other embodiments have printing through a driver to print services from client platforms. For example, the driver can be a universal print driver, and the print service translates data to be printer specific. Furthermore in one embodiment, functions of the print driver are provided by the cloud, not the electronic device that initiated the print job request.

After the printer is uniquely identifies itself to the ISP, the printer automatically communicates its properties to the ISP. An example is enabling color output only if the printer supports color output. The printer properties are stored and installed into the cloud print system by making use of REST API by the printer. Once the printer identity is established with the cloud print system, a sequence of operations occurs. By way of example, such operations can include 1. Validation of connectivity of the printer to the cloud print service;
2. Recognition by the cloud print service of receiving the printer parameters and being able to process such information (for example, acknowledge is provided with visible output at the printer).

During the auto-setup phase, ownership of the printer is also established. The cloud print service assigns or designates each printer with an owner (for example, a person who has not only printing rights but also administrative rights).

Confirmation of this ownership can occur at the printer (for example, the printer prints a test page or displays acknowledgement of ownership on a display), Furthermore, the printer can also confirm successful installation of the printer to the cloud print service (for example, with a printout, display message, email or text to owner, etc.).

In another example embodiment, ownership is established after the printer is installed with the cloud server. In this instance, the user ID, user password, and unique identification of the printer are used for tagging ownership.

In one example embodiment, once ownership is established, a unique identification is provided to the owner (for example, the owner is provided with a user ID and a password is associated with the user ID). Thereafter, the user can login to cloud print service with the user ID and password and print to the printer. Login can occur from any worldwide location with network or Internet access (such as a user logging in with a remote portable electronic device and sending a print job to the printer). From the printer or a remote electronic device, the owner can also perform various system changes to the printer (such as changing default print setup for the printer, changing username and/or password, designating other individuals with printing rights to the printer, etc.).

In one embodiment, installation of the printer with the cloud print service occurs without the use of a personal computer (PC). Communication between the printer and cloud print service is sufficient to install the printer with the cloud and enable subsequent remote printing with an electronic device by the owner.

Figure 1:
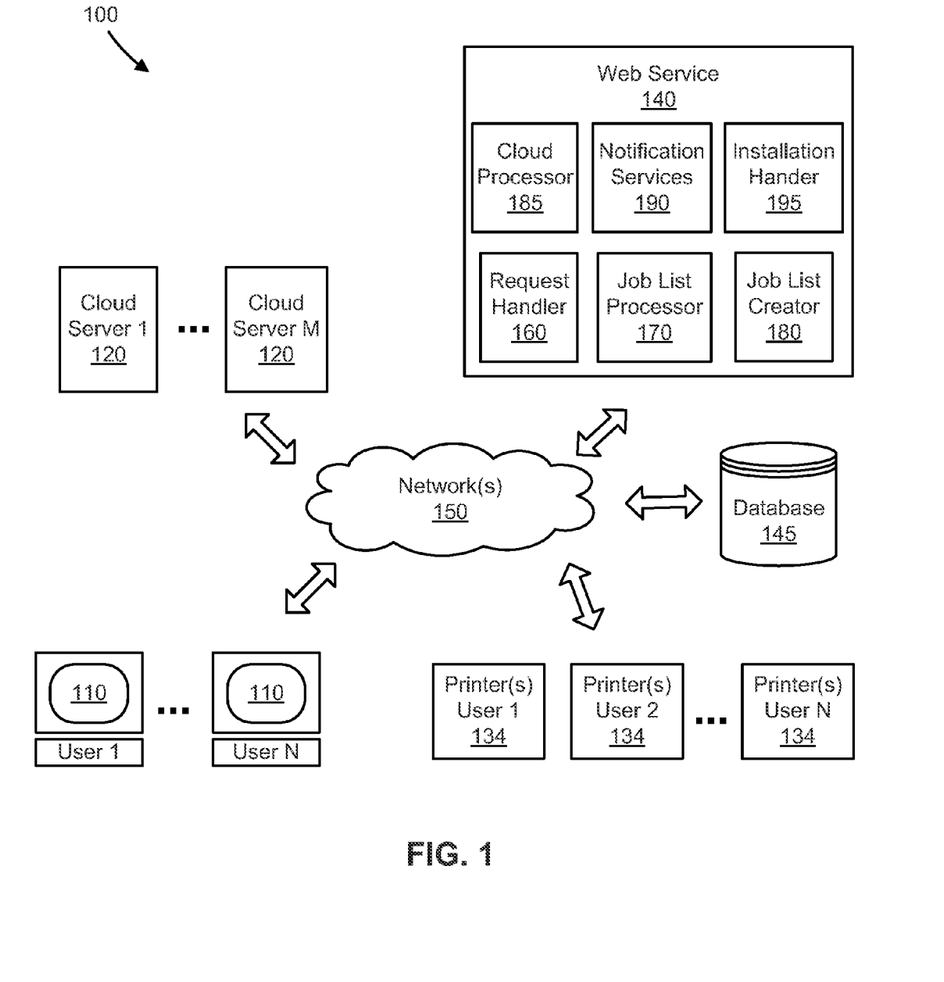
FIG. 1 shows a cloud print system in accordance with an example embodiment.

FIG. 1 shows a cloud print system 100 in accordance with an example embodiment of the present invention. The system includes a plurality of users or computers 110 (shown as user 1 to user N), a plurality of cloud servers 120 (shown as cloud server 1 to cloud server M), a plurality of printers 134 for the users, a web service 140, and a database 145 in communication with each other through one or more networks 150 (such as the internet and world wide web or web). The web service 140 further includes a request handler 160, job list processor 170, job list creator 180, cloud processor 185, notification services 190, and installation handler 195. The cloud processor 185 performs processing functions for the cloud, and the notification services 190 notifies a user, computer, or administrator of job status, such as print job complete, printing error, etc. The installation handler 195 communicates with the printers 134 to install the printers, as discussed herein with example embodiments.

The cloud print system provides printing services to users who connect to the cloud through the internet. Users are able to print to their printers from different geographical locations around the world upon installing a printer and establishing ownership or user rights with the printer.

Generally, a print job work item is performed with the following operations: handling user requests, creating a job list, and processing the job list. The print job request handler 160 acts on user requests. The job list creator 180 creates job steps, and the job list processor 170 executes the job steps according to the assigned priorities. These tasks are more fully discussed in U.S. patent application having Ser. No. 12/544,223 entitled "Web Printing" which was filed 20 Aug. 2009 and incorporated herein by reference.

Figure 2:
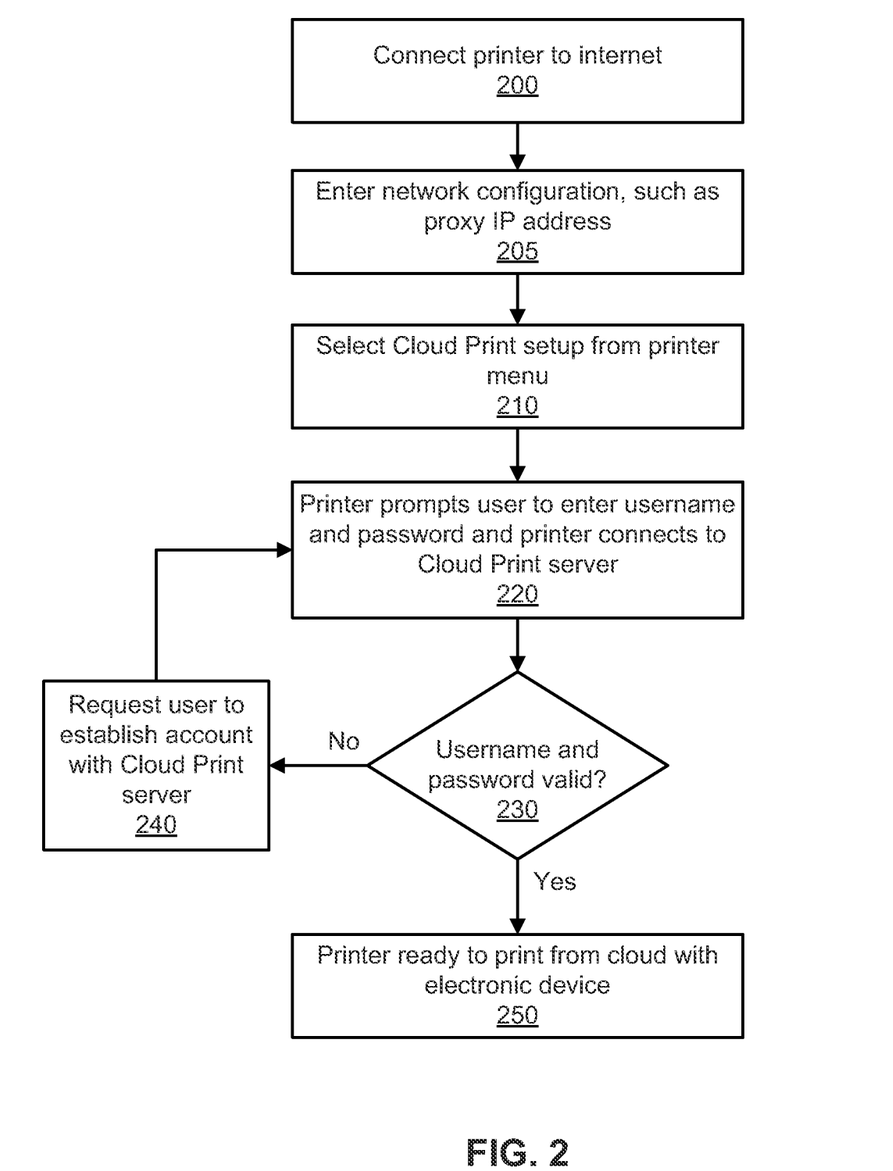
FIG. 2 shows a flow diagram to register a new printer with a cloud print server in accordance with an example embodiment.

FIG. 2 shows a flow diagram to register a new printer with a cloud print server in accordance with an example embodiment.

According to block 200, the printer is connected to a network, such as the internet. By way of example, the printer can be an existing printer of a user or a newly purchased printer (i.e., an out-of-the-box printer).

According to block 205, network configuration information, such as a proxy Internet Protocol (IP) address, is entered. In one embodiment, the printer has a control panel and display through which a user can enter information.

According to block 210, cloud print setup is selected from a menu display at the printer. After the printer is powered-on, the user can navigate through one or more menu options displayed on the printer and select an option to connect the printer to server and cloud print services. Alternatively, the printer can be configured to automatically provide this option to the user (for example, upon power-up, the printer asks the user if he or she desires to connect to the cloud print server). As yet another alternatively, upon power-up and being connected to a network, the printer automatically connects to the cloud print server (i.e., without input from the user).

According to block 220, the printer prompts the user to enter a username and password, and the printer connects to the cloud print server. The username uniquely identifies the user to the cloud print server which stores a list of previously registered users and their associated printers.

According to block 230, a question is asked whether the username and password are valid.

If the username and password are not valid, then flow proceeds to block 240. Here, the cloud print server requests the user to establish a username and password. New users may not be registered with the cloud print server and can register at this time. By way of example, registration includes the user providing personal information, such as name, address, designation other individuals who are authorized to print to the printer, identification of portable electronic devices from which the user will print to the printer, geographical location, phone numbers, email address, etc. Once the user established an account (i.e., username and password), then flow proceeds back to block 220.

If the username and password are valid, then flow proceeds to block 250. Here, the printer is ready to print from the cloud with an electronic device. Once the printer is successfully logged into the cloud, the user can print to the printer from any electronic device that can communicate with the cloud. In one embodiment, the user enters his or her username and password from the electronic device. The cloud print server stores the usernames and their associated installed printers. Alternatively, the electronic device itself is previously registered with the cloud print server as being owned by the user. The user connects to the server with the electronic device, and the server automatically recognizes the electronic device as belonging to the user.

Once the printer successfully connects to the cloud print server, printing properties of the printer are installed or uploaded to the cloud print server. By way of example, such printing properties include, but are not limited to, the following: PDL (PostScript, PCL 5c, PCL 6, PDF, etc.), Default paper size (Letter or A4 or . . . ), Color support, Duplex support, etc. In one example embodiment, the printing properties are installed using representational state transfer application program interface (REST API).

The user can also be requested to enter a name of the printer and other parameters, such as geo-code, location of the printer, personal information, etc. As shown in FIG. 1 for example, a single user (such as User 1) can have multiple different printers (such as Printers for User 1 at 134) registered and installed on the cloud. In order to distinguish between these printers, the user or owner designates a name for each of the printers (such as "Home Printer" or "Office Printer" or "Desktop Printer", etc.). When the user is mobile and away from the physical location of the printers, the user can access each of the printers over the cloud. After the cloud server establishes an identity of the user, the user can select from a list of names to determine to which printer the user desires to print or access.

Once the printer is successfully installed and registration or installation of the printer is validated, the printer is now web-enabled and ready to print from remote electronic devices of the user.

Figure 3:
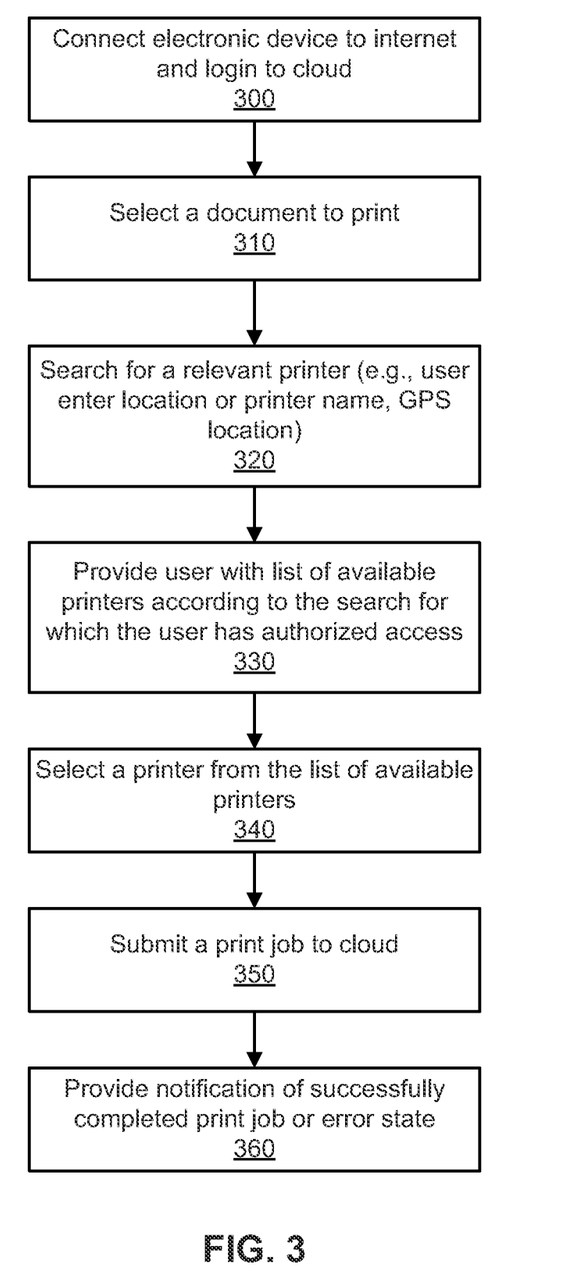
FIG. 3 shows a flow diagram to print to a printer installed on a cloud in accordance with an example embodiment.

FIG. 3 shows a flow diagram to perform a print operation to a printer installed on a cloud in accordance with an example embodiment. For illustration, the flow diagram is directed to performing a print job to a cloud printer from a remote electronic device. Example embodiments, however, are not limited to printing, but include other print operations, such as managing, installing, registering, and monitoring a print job and/or cloud printing device.

According to block 300, the electronic device is connected to the internet, and the user and/or electronic device logins to the cloud print server. For example, the user enters a username and password to login to the cloud.

According to block 310, the user selects a document to print. In one embodiment, the document currently displayed on the electronic device is, by default, a document selected for printing. In another embodiment, the user can select a document stored on the electronic device, stored on the cloud, or stored at another network location.

According to block 320, a search for relevant printers occurs. In one embodiment, relevant printers are printers associated with the user (for example, the user has rights or privileges to print to these cloud printers, which include both public and private printers). The electronic device submits a search query to the cloud server to locate relevant printers to which the user of the electronic device is authorized to print.

In one embodiment, a list of all available or relevant printers is provided to the user (i.e., all printers to which the user has printing privileges). In another embodiment, a search can be performed for one or more specific printers. For example, a user can enter a geographical location for printers (e.g., find printers located in a specific city), enter a specific name of a printer (e.g., find "home" or "office" printer of the user), or enter a current location and find printers within a specific proximity of this location (e.g., enter current GPS information and find printers within 1-10 kilometers of this location). Instead of the user entering this information to find a printer, the electronic device can automatically perform this step for the user and locate the relevant printers.

According to block 330, the user is provided with a list of available printers according to the search and for which the user has authorized access. In one embodiment, these printers are displayed on a display of the electronic device.

According to block 340, the user selects a printer from the list of available printers. For example, with a click operation or other actuation (e.g., a menu selection), the user selects one of the relevant printers.

According to block 350, the selected document is submitted for printing to the cloud printer. The print job request is transmitted from the electronic device over the internet to the cloud print server.

According to block 360, the user and/or electronic device is provided with a notification of successfully completed print job. Alternatively, if the print job is not successfully completed (e.g., a print error occurs), the user is notified.

Figure 4:
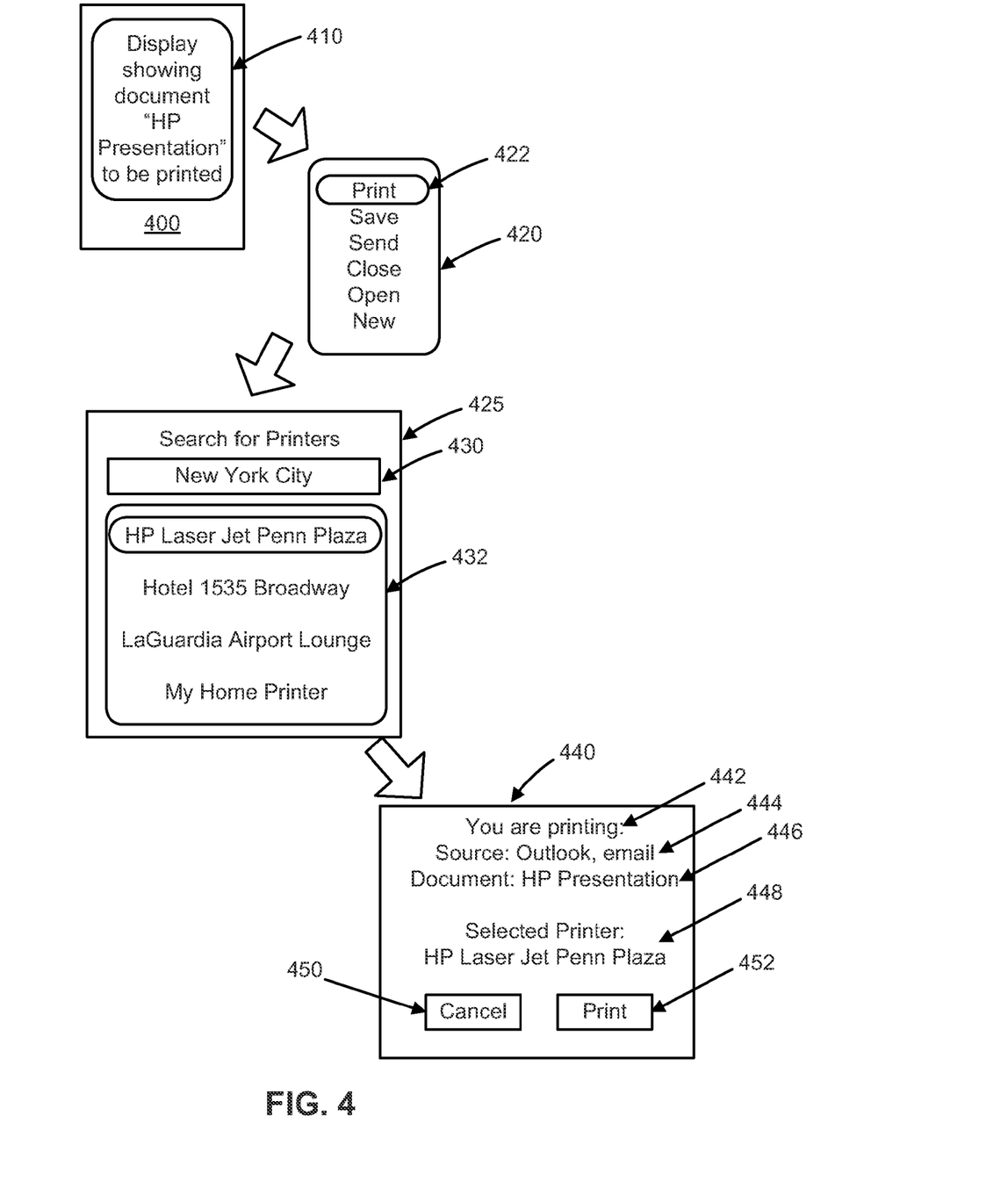
FIG. 4 shows a display of an electronic device providing a common user print experience in accordance with an example embodiment.

FIG. 4 shows a display 410 of an electronic device 400 providing a common user print experience in accordance with an example embodiment.

As used herein, a "common user print experience" means that different electronic devices (such as laptops, cameras, mobile telephone, personal digital assistants, etc.) executing different operating systems display a same or similar set of steps or procedures to perform a print operation from the electronic device over the Internet to a cloud printer. This common user print experience occurs regardless of the operating system executing on the electronic device, which is not required to have an installed print driver. This common user print experience exists when printing from and/or to different electronic devices and/or different platforms (e.g., from different operating systems, to different printers from different manufacturers, such as an inkjet printer from one manufacturer and a laser printer of another manufacturer). Furthermore, this common user print experience occurs regardless of geographical location of the user or the printer on the cloud (such as a home printer, office printer, or public printer) that is accessed across any network (internet, intranet, VPN, etc). Further yet, print jobs are not limited to any particular type of document and include different document types, such as PDF, DOC, PPT, etc. Additionally, a common user print experience is not limited to performing print jobs but includes other operations, such as monitor and/managing a print job, a printer or printing device, etc. (e.g., job cancel, monitor printer status, etc.).

The common user experience is not limited to being presented on a display of the electronic device. This experience can be achieved through interaction flow consisting of similar steps. For example, this interaction can be executed through a visual interface (display, screen, etc.), voice interface or gesture and or multi-modal interface.

Figure 5:
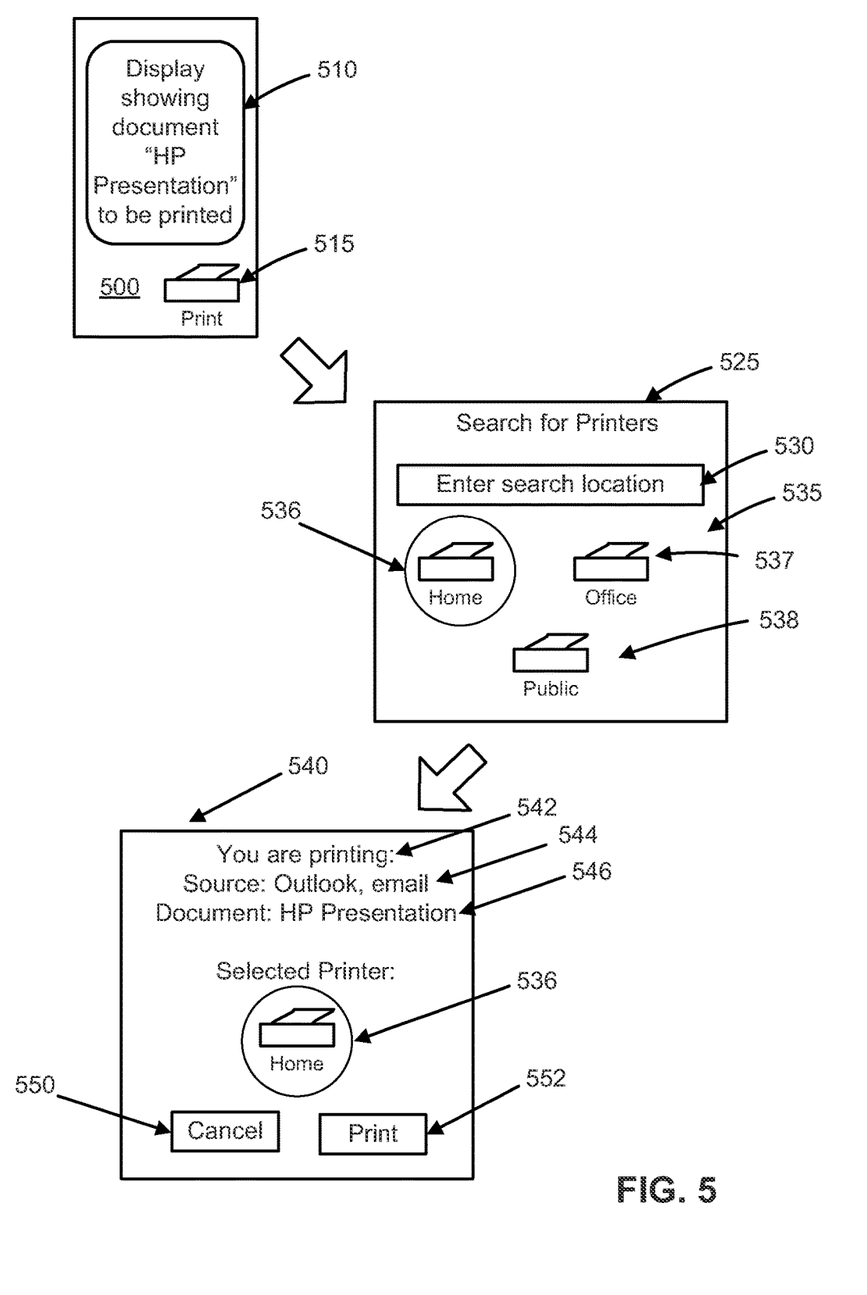
FIG. 5 shows another display of an electronic device providing a common user print experience in accordance with an example embodiment.

FIGS. 4 and 5 illustrate example displays being presented to users during this common user print experience. The items being displayed (e.g., graphics and text) can occur on different electronic devices that execute different operating systems. For example, a user executing a printer operation on a laptop computer can visually see on the display a similar or same set of text and graphics as a user executing a print operation on a mobile telephone or BlackBerry device. Likewise, the user on the laptop would undergo similar or same steps to print as the user on the mobile telephone.

As shown in FIG. 4, the display 410 depicts a document that the user desires to print to a cloud printer (for example, as discussed in block 310 of FIG. 3).

The user selects an action to perform on the document. For example, from a pull-down menu, the user is provided with a list of possible actions 420 that include print, save, send, close, open, new. The print option 422 is selected as the desired option.

Once the print option 422 is selected, a search for printers box 425 appears on the display 410. The search for printers box 425 includes a query area or box 430 and a results display area or box 432. As illustrated in FIG. 4, the user has entered "New York City" as the location to be searched for relevant printers (for example, as discussed in block 320 of FIG. 3). The results of the search are displayed in display area 432 (for example, as discussed in block 330 of FIG. 3). Four relevant printers are displayed to the user (HP Laser Jet Penn Plaza, Hotel 1535 Broadway, LaGuardia Airport Lounge, and My Home Printer).

The printers displayed to the user are a list of all available or relevant printers to which the user is authorized to print. This list can include public printers (i.e., printers available to the general public, such as the printer at the LaGuardia Airport Lounge) and private printers (such as home or office printers, one being shown as My Home Printer). As illustrated in FIG. 4, the user has selected to print to "HP Laser Jet Penn Plaza" (for example, as discussed in block 340 of FIG. 3).

After the user selects one of the listed relevant printers, a print box 440 appears on the display 410. This box displays the selected information and requests confirmation of printing. By way of illustration, the display provides print notification 442 ("Your are printing"), source of the document being printed 444 ("Source: Outlook, email"), name of the document selected for printing 446 ("Document: HP Presentation"), and the printer selected for the printer operation 448 ("Selected Printer: HP Laser Jet Penn Plaza"). The print box 440 also requests confirmation for the print operation, and the user is provided with two choices: cancel 450 or print 452. Selection of cancel 450 cancels the print operation, and selection of print 452 performs the print operation.

FIG. 5 shows a display 510 of an electronic device 500 providing a common user print experience in accordance with an example embodiment. The display 510 depicts a document that the user desires to print to a cloud printer (for example, as discussed in block 310 of FIG. 3).

The display 510 includes a print icon or widget 515. In order to print the document, the user performs a drag and drop operation wherein the document is moved or dragged to the print icon 515. This action selects the document for printing. Alternatively, the user can click or actuation the print icon to commence the print operation of the document.

Once the print option is selected, a search for printers box 525 appears on the display 510. The search for printers box 525 includes a query area or box 530 and a results display area 535 that lists with icons relevant printers. As illustrated, three relevant printers are displayed: a home printer 536, an office printer 537, and a public printer 538 (for example, as discussed in block 330 of FIG. 3). As illustrated in FIG. 5, the user has selected to print to "Home" printer 536 (for example, as discussed in block 340 of FIG. 3).

In one embodiment, the user does not select a printer from the list of available printers. Instead, a printer is automatically selected, such as a printer being selected as a default printer or a printer last used.

In one embodiment, the three icons are displayed to represent three classes of printers: home, office, and public. Clicking on one of these icons displays all relevant printers for the selected class. For example, when the user clicks on the "Public" printer icon 538, all relevant public printers are displayed to the user. As another example, when the user clicks on the "Office" printer icon 536, all relevant office printers are displayed to the user.

After the user selects one of the listed relevant printers, a print box 540 appears on the display 510. This box displays the selected information and requests confirmation of printing. By way of illustration, the display provides print notification 542 ("Your are printing"), source of the document being printed 544 ("Source: Outlook, email"), name of the document selected for printing 546 ("Document: HP Presentation"), and the printer selected for the printer operation ("Home" printer icon 536 being selected). The print box 540 also requests confirmation for the print operation, and the user is provided with two choices: cancel 550 or print 552. Selection of cancel 550 cancels the print operation, and selection of print 552 performs the print operation.

Figure 6:
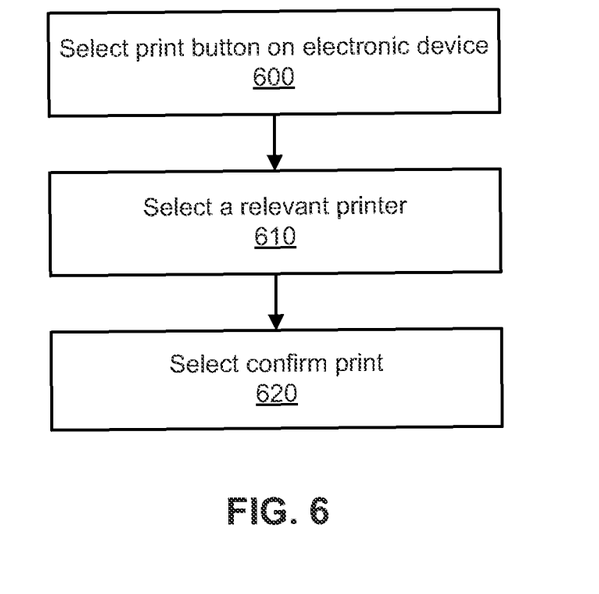
FIG. 6 shows a flow diagram of printing with three key actuations in accordance with an example embodiment.

FIG. 6 shows a flow diagram of printing with three key or click actuations in accordance with an example embodiment.

According to block 600, a print button is selected on the electronic device. For example, the user clicks a print icon displayed on the electronic device. Alternatively, the user selects a print option from a menu displayed on the electronic device.

According to block 610, a relevant printer is selected. One or more relevant printers can be registered and connected to the cloud for which the user is authorized to print. These printers can be provided or displayed to the user for selection. Alternatively, a relevant cloud printer can be automatically selected for the user.

According to block 620, a confirmation of print is selected. Once a printer is selected for the print job, a confirmation is provided on the display of the electronic device to the user. The confirmation confirms the print operation and other information, such as name of printer, location of printer, name of document to be printed, location of document, etc.

One example embodiment thus enables a user to print a document to a cloud printer with three clicks or actuations: (1) selecting a print button or print command, (2) selecting a relevant print to which the document will be printed, and (3) confirming the print operation.

Once the relevant printer is selected, the user can also be provided with an option to view and/or change print parameters. For example, the user can view and/or change one or more of the number of copies being printed, the print quality, the color, select pages to print, orientation (landscape or portrait), location to store the document (e.g., store on cloud server), etc.

In one embodiment, the user can print with less than three actuations or clicks. The electronic device and/or cloud server can automatically select a printer for the user. For example, the electronic device includes a global positioning system (GPS) that automatically locates the location of the electronic device and transmits this location to the cloud print server. The server, in turn, determines a printer closest to the user and selects this printer as the current default print. Alternatively, the user can have a list of favorite printers. The server selects from this list of favorite printers depending on the location of the user. As yet another alternative, the server selects a printer based on the availability of the relevant printers. If one relevant printer is busy printing other print jobs, the server selects another or least busy printer to expedite printing of the document for the user.

With example embodiments, users are able to print from a mobile or portable electronic device from any location (home, office, on the go) to any relevant cloud printer. The electronic device is not required to have a print driver. Instead, printing is performed to the cloud print server using a minimal (e.g., three) clicks or actuations on the electronic device. Regardless of the electronic device, users are provided with a uniform or similar print experience (i.e., the steps for performing a print operation to a cloud print server are equivalent from one device to another device regardless of the OS executing on the devices). The electronic devices can also be provided with a print button, icon, or widget embedded in an application executing on the electronic device. Printing to a relevant cloud printer commences with a single click of this button or a single drag-and-drop operation of a document to the icon.

Users can search for relevant printers or have the electronic device in conjunction with the print server search for such printers. A relevant printer for a user can be based on location of the user and/or electronic device (e.g., GPS location, postal zip code, street address, etc.), time, features desired for printing, etc. Furthermore, users can print in virtual private network (VPN) and non-VPN environments.

With example embodiments, users can print from an application such as browser, custom applications, widget, etc., to a cloud printer on the web. Various types of documents can be printed, such as text, images, PDF, etc. The electronic device submitting the print request may not contain associated application.

Example embodiments provide an ability to separate out association for document viewing and for printing. A specific application (such as Word) is not required to print associated documents from a given device. Printer identification, access, connectivity is simplified since users experience common across platforms and operating systems. This common experience can include users performing three steps for submitting a print job: (1) search a printer based on location, (2) select a document, and (3) submit a print job.

Provisioning of a printer is also simplified regardless of the OS or the type of printer. The printer owner can activate the printer by means of registration process over the web. The registration process involves device type recognition, manually linking the device to a printer owner and associating printer usage characteristics such as shared, location, etc., Printer provisioning eliminates the need for creation of logical devices such as USB device, LPT device, TCP printer port, etc., on operating system.

Figure 7:
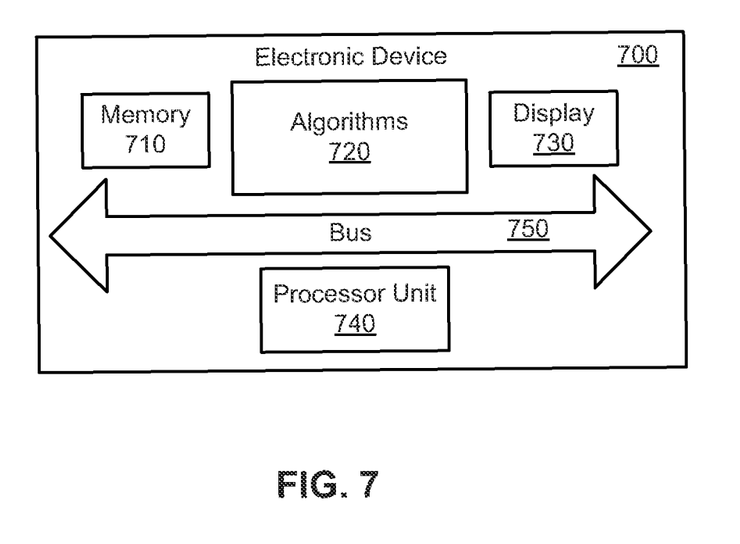
FIG. 7 is a computer system in a cloud print system in accordance with an example embodiment.

FIG. 7 is a block diagram of an electronic device 700 in a cloud print system in accordance with an example embodiment. The electronic device 700 includes memory 710, algorithms 720, display 730, processing unit 740, and one or more buses 750. The processor unit includes a processor (such as a central processing unit, CPU, microprocessor, application-specific integrated circuit (ASIC), etc.) for controlling the overall operation of memory 710 (such as random access memory (RAM) for temporary data storage, read only memory (ROM) for permanent data storage, and firmware). The processing unit 740 communicates with memory 710 and algorithms 520 via one or more buses 750 and performs operations and tasks that implement one or more blocks of the flow diagrams discussed herein. The memory 710, for example, stores applications, data, programs, algorithms (including software to implement or assist in implementing embodiments in accordance with the present invention) and other data.

DEFINITIONS

As used herein and in the claims, the following words are defined as follows:

The term "cloud" is a computer network accessible over the internet and/or web that is dynamically scalable with virtualized resources, such as printing resources. Users are not required to have knowledge or expertise in the infrastructure of the cloud that relies on the Internet to satisfy the computing or printing needs of users. The cloud provides computer and/or printer services with business applications that are accessible from a web browser while software and data are stored on servers in the cloud. For example, a printing cloud system supports infrastructure for printer services, platform for the printer services, and software for the printer services.

The term "printer" means an electronic device that prints and includes multi-functional electronic devices that perform functions such as printing, scanning, and/or copying.

The term "web-enabled" printer is a printer that is accessed to print documents over the web.

The term "world wide web" or "web" is a system of linked hypertext documents access through the internet. Using a web browser, a user can view web pages that include text, images, video, and other media and navigate between these pages with hyperlinks.

Example embodiments are discussed in connection with a printer. Example embodiments, however, are not limited to a printer but include various other types of electronic devices that perform one or more functions such as printing, scanning, or copying.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for performing print operations, the method being performed by one or more processors of a server computing system and comprising:
    receiving, at the server computing system, from a portable electronic device, a document to be printed;
    receiving, at the server computing system, from the portable electronic device, information indicating a desired geographical location for printing the document;
    based on the information indicating the desired geographical location, locating, by the one or more processors of the server computing system, a plurality of available printers for printing the document;
    providing, from the server computing system to the portable electronic device, a list of the available printers;
    in response to receiving a selection of one of the available printers from the portable electronic device, transferring the document from the server computing system to the selected printer for printing the document; and
    providing a notification, to the portable electronic device, indicating a location of the selected printer.

2. The method of claim 1, further comprising:
    receiving format data about the document to be printed, and
    prior to transferring the document to the selected printer, converting, by the server computing system, the document into a print-ready format according to properties of the selected printer.

3. The method of claim 1, wherein each of the plurality of printers is registered with the server computing system.

4. The method of claim 3, further comprising:
    maintaining information about the plurality of printers, the information including a name and properties for each of the plurality of printers.

5. The method of claim 4, wherein the information about the plurality of printers further includes location information corresponding to a respective location for each of the plurality of printers.

6. The method of claim 1, wherein locating the plurality of available printers for printing the document is further based on a current location of the portable electronic device.

7. The method of claim 1, further comprising:
    designating the selected printer as a default printer for the portable electronic device.

8. A server computing system comprising:
    one or more processors; and
    one or more memory resources storing instructions that, when executed by the one or more processors, cause the server computing system to:
        receive, from a mobile computing device, a document to be printed;
        receive, from the mobile computing device, information indicating a desired geographical location for printing the document;
        based on the information indicating the desired geographical location, locate available printers for printing the document;
        provide a list of the available printers to the mobile computing device;
        in response to receipt of a selection of one of the available printers, transfer the document from the server computing system to the selected printer; and
        provide a notification, to the mobile computing device, indicating a location of the selected printer.

9. The system of claim 8, wherein the instructions are to cause the server computing system to:
    receive format data about the document to be printed, and
    prior to transferring the document to the selected printer, convert the document into a print-ready format according to properties of the selected printer.

10. The system of claim 8, wherein each of the plurality of printers is registered with the server computing system.

11. The system of claim 8, wherein the instructions, when executed by the one or more processors, are to cause the server computing system to:
    maintain information about the plurality of printers, the information including a name and properties for each of the plurality of printers.

12. The system of claim 11, wherein the information about the plurality of printers further includes location information corresponding to a respective location for each of the plurality of printers.

13. The system of claim 8, wherein to locate the plurality of printers for printing the document, the instructions are to further cause the server computing system to locate printers that are within a predetermined proximity of a current location of the mobile computing device.

14. A non-transitory computer readable medium storing instructions that when executed by a processor of a server computing system cause the server computing system to:
- receive, from a portable electronic device, a document to be printed;
- receive, from the portable electronic device, information indicating a desired geographical location for printing the document;
- determine, from a user account associated with a user of the portable electronic device, a plurality of printers within the desired geographical location;
- provide a list of the plurality of printers to the portable electronic device;
- in response to receipt of a selection of one of the printers from the portable electronic device, transfer the document to the selected printer; and
- provide a notification, to the portable electronic device, indicating a location of the selected printer.

15. The non-transitory computer readable medium of claim 14, wherein the instructions are to cause the server computing system to:
- receive, from the portable electronic device, format data about the document to be printed, and
- prior to transferring the document to the selected printer, convert the document into a print-ready format according to properties of the selected printer.

16. The non-transitory computer readable medium of claim 14, wherein each of the plurality of printers is registered with the server computing system.

17. The non-transitory computer readable medium of claim 16, further comprising wherein the instructions are to cause the server computing system to:
- maintain information about the plurality of printers, the information including a name and properties for each of the plurality of printers.

18. The non-transitory computer readable medium of claim 17, wherein the information about the plurality of printers further includes location information corresponding to a respective location for each of the plurality of printers.

19. The non-transitory computer readable medium of claim 18, wherein to locate the plurality of printers, the instructions are to cause the server computing system to locate printers that are within a predetermined proximity of a current location of the portable electronic device.

20. The non-transitory computer readable medium of claim 19, wherein the instructions are to cause the server computing system to:
- designate the selected printer as being a default printer for the portable electronic device.

* * * * *

UNITED STATES PATENT AND TRADEMARK OFFICE
CERTIFICATE OF CORRECTION

PATENT NO. : 9,817,622 B2  
APPLICATION NO. : 13/387029  
DATED : November 14, 2017  
INVENTOR(S) : Harish B. Kamath et al.

Page 1 of 1

It is certified that error appears in the above-identified patent and that said Letters Patent is hereby corrected as shown below:

On the Title Page

Item (75), Inventors, in Column 1, Line 2, delete "Karanataka" and insert -- Karnataka --, therefor.

In the Claims

In Column 14, Line 10, in Claim 17, delete "further comprising wherein" and insert -- wherein --, therefor.
In Column 14, Line 27, in Claim 20, delete "being a default" and insert -- a default --, therefor.

Signed and Sealed this  
Twenty-sixth Day of November, 2019

Andrei Iancu  
*Director of the United States Patent and Trademark Office*